United States Patent
Nagashige

(10) Patent No.: US 9,998,376 B2
(45) Date of Patent: Jun. 12, 2018

(54) CONTROL DEVICE, COMMUNICATION SYSTEM, CONTROL METHOD, AND NON-TRANSITORY RECORDING MEDIUM

(71) Applicant: Yuko Nagashige, Osaka (JP)

(72) Inventor: Yuko Nagashige, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 11 days.

(21) Appl. No.: 15/340,379

(22) Filed: Nov. 1, 2016

(65) Prior Publication Data

US 2017/0149663 A1 May 25, 2017

(30) Foreign Application Priority Data

Nov. 24, 2015 (JP) .................. 2015-228541

(51) Int. Cl.
*H04L 12/741* (2013.01)
*H04L 12/46* (2006.01)
*H04L 12/713* (2013.01)

(52) U.S. Cl.
CPC ........ *H04L 45/745* (2013.01); *H04L 12/4633* (2013.01); *H04L 45/586* (2013.01); *H04L 2212/00* (2013.01)

(58) Field of Classification Search
CPC . H04L 45/745; H04L 45/586; H04L 12/4633; H04L 12/46
See application file for complete search history.

(56) References Cited

U.S. PATENT DOCUMENTS

| 2014/0177634 A1* | 6/2014 | Jiang | H04L 45/64 370/392 |
| 2015/0078362 A1* | 3/2015 | Kunieda | H04W 76/028 370/338 |
| 2015/0180673 A1* | 6/2015 | Kuwata | H04L 45/16 370/254 |

FOREIGN PATENT DOCUMENTS

| JP | 2004-180023 | 6/2004 |
| JP | 2006-020266 | 1/2006 |
| JP | 2015-122665 | 7/2015 |

* cited by examiner

*Primary Examiner* — Lakeram Jangbahadur
(74) *Attorney, Agent, or Firm* — Oblon, McClelland, Maier & Neustadt, L.L.P.

(57) ABSTRACT

A control device controls two terminating devices virtually directly connected to each other on a network, and includes a memory, an acquisition unit, a generation unit, and a transmission unit. The memory stores address information of each of the terminating devices belonging to mutually different segments on the network. The acquisition unit acquires, from the each of the terminating devices, information of a communication device residing in the segment to which the each of the terminating devices belongs. The generation unit generates, with the address information of the each of the terminating devices stored in the memory and the acquired information of the communication device residing in the segment, a processing rule to be used by the each of the terminating devices to perform a process of transferring input information. The transmission unit transmits the processing rule generated by the generation unit to the each of the terminating devices.

8 Claims, 7 Drawing Sheets

| TERMINATING DEVICE | CONTROL PLANE PORT | | DATA PLANE PORT | |
|---|---|---|---|---|
| | IP ADDRESS | MAC ADDRESS | IP ADDRESS | MAC ADDRESS |
| TERMINATING DEVICE 10 | IP ADDRESS OF P10 | MAC ADDRESS OF P10 | IP ADDRESS OF P11 | MAC ADDRESS OF P11 |
| TERMINATING DEVICE 11 | IP ADDRESS OF P20 | MAC ADDRESS OF P20 | IP ADDRESS OF P21 | MAC ADDRESS OF P21 |

FIG. 6

| PORT NUMBER | MAC ADDRESS OF DEVICE IN LOCAL SEGMENT | IP ADDRESS OF DEVICE IN LOCAL SEGMENT |
|---|---|---|
| 1 | MAC ADDRESS OF COMMUNICATION DEVICE 18 | IP ADDRESS OF COMMUNICATION DEVICE 18 |
| 2 | MAC ADDRESS OF COMMUNICATION DEVICE 12 | IP ADDRESS OF COMMUNICATION DEVICE 12 |

FIG. 7

| TERMINATING DEVICE | PORT NUMBER | MAC ADDRESS OF DEVICE IN LOCAL SEGMENT | IP ADDRESS OF DEVICE IN LOCAL SEGMENT |
|---|---|---|---|
| TERMINATING DEVICE 10 | 1 | MAC ADDRESS OF COMMUNICATION DEVICE 18 | IP ADDRESS OF COMMUNICATION DEVICE 18 |
| | 2 | MAC ADDRESS OF COMMUNICATION DEVICE 12 | IP ADDRESS OF COMMUNICATION DEVICE 12 |
| TERMINATING DEVICE 11 | 1 | MAC ADDRESS OF COMMUNICATION DEVICE 19 | IP ADDRESS OF COMMUNICATION DEVICE 19 |
| | 2 | MAC ADDRESS OF COMMUNICATION DEVICE 13 | IP ADDRESS OF COMMUNICATION DEVICE 13 |

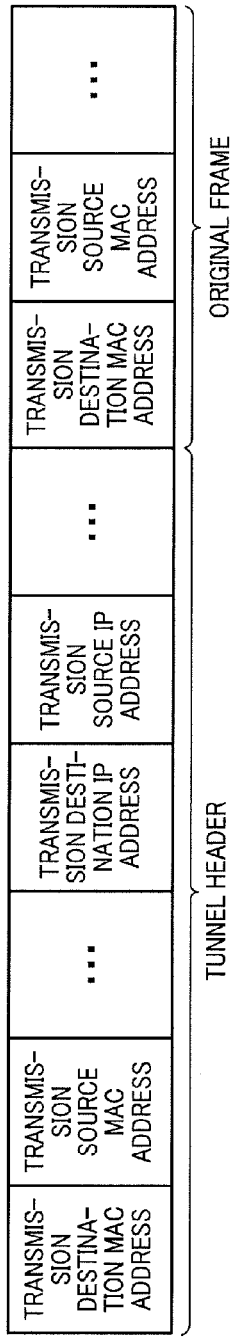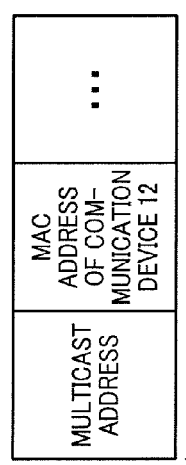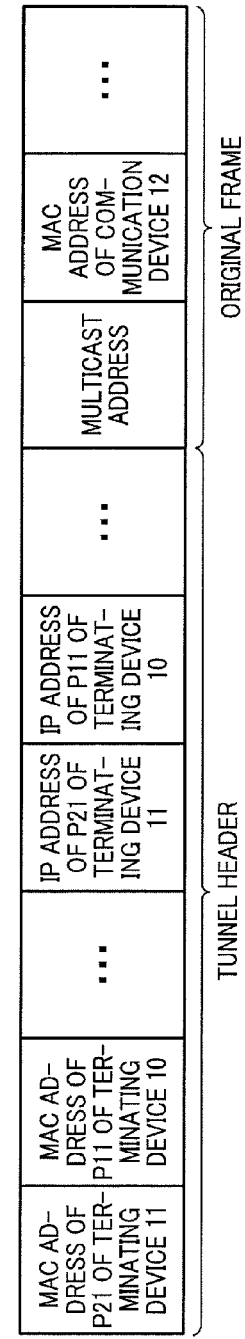

CONTROL DEVICE, COMMUNICATION SYSTEM, CONTROL METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2015-228541 filed on Nov. 24, 2015, in the Japan Patent Office, the entire disclosure of which is hereby incorporated by reference herein.

BACKGROUND

Technical Field

This disclosure relates to a control device that controls two terminating devices virtually directly connected to each other on a network, a communication system including the control device, a control method, and a non-transitory recording medium storing a program for causing a computer to execute the control method.

Related Art

Different segments on a network are connected by relay devices called routers. A broadcast packet to be transmitted to unspecified parties or a multicast packet to be transmitted to specified parties fails to be transmitted from one segment to another segment beyond routers unless the routers are set up for such the transmission.

A technique called tunneling creates a network that virtually directly connects devices to each other with a process of encapsulating packets in accordance with the same protocol or the protocol in a higher layer of the open systems interconnection (OSI) reference model.

The tunneling technique includes "L2 over L3," which encapsulates a packet in Layer 2 (L2) serving as a data link layer with a packet in Layer 3 (L3) serving as a network layer.

A technique using L2 over L3 encapsulates a packet such as a broadcast packet into a unicast packet to be addressed to a terminal end of a tunnel, and decapsulates the encapsulated packet at the terminal end, to thereby transmit the packet beyond routers to a terminal located downstream of the terminal end in a different segment.

SUMMARY

In one embodiment of this disclosure, there is provided an improved control device that controls two terminating devices virtually directly connected to each other on a network, and includes, for example, a memory, an acquisition unit, a generation unit, and a transmission unit. The memory stores address information of each of the terminating devices. The terminating devices respectively belong to mutually different segments on the network. The acquisition unit acquires, from the each of the terminating devices, information of a communication device residing in the segment to which the each of the terminating devices belongs. The generation unit generates, with the address information of the each of the terminating devices stored in the memory and the information of the communication device residing in the segment acquired by the acquisition unit, a processing rule to be used by the each of the terminating devices to perform a process of transferring input information. The transmission unit transmits the processing rule generated by the generation unit to the each of the terminating devices.

In one embodiment of this disclosure, there is provided an improved communication system including the above-described control device and two terminating devices virtually directly connected to each other on a network.

In one embodiment of this disclosure, there is provided an improved control method of controlling two terminating devices virtually directly connected to each other on a network. The control method includes, for example, storing, in a memory, address information of each of the terminating devices, the terminating devices respectively belonging to mutually different segments on the network, acquiring, from the each of the terminating devices, information of a communication device residing in the segment to which the each of the terminating devices belongs, generating, with the address information of the each of the terminating devices stored in the memory and the acquired information of the communication device residing in the segment, a processing rule to be used by the each of the terminating devices to perform a process of transferring input information, and transmitting the generated processing rule to the each of the terminating devices.

In one embodiment of this disclosure, there is provided a non-transitory recording medium storing a program for causing a computer to execute the above-described control method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a table illustrating an example of information of communication devices in a local segment of one of the terminating devices, which is managed by the terminating device;

FIG. 7 is a table illustrating an example of information of communication devices in local segments of the terminating devices, which is managed by the control device;

FIG. 8 is a diagram illustrating a configuration of a packet used in tunneling;

FIG. 9 is a diagram illustrating an example of an original frame transmitted by one of the communication devices to the corresponding terminating device;

FIG. 10 is a diagram illustrating an example of a packet encapsulated in the terminating device;

Figure 1:
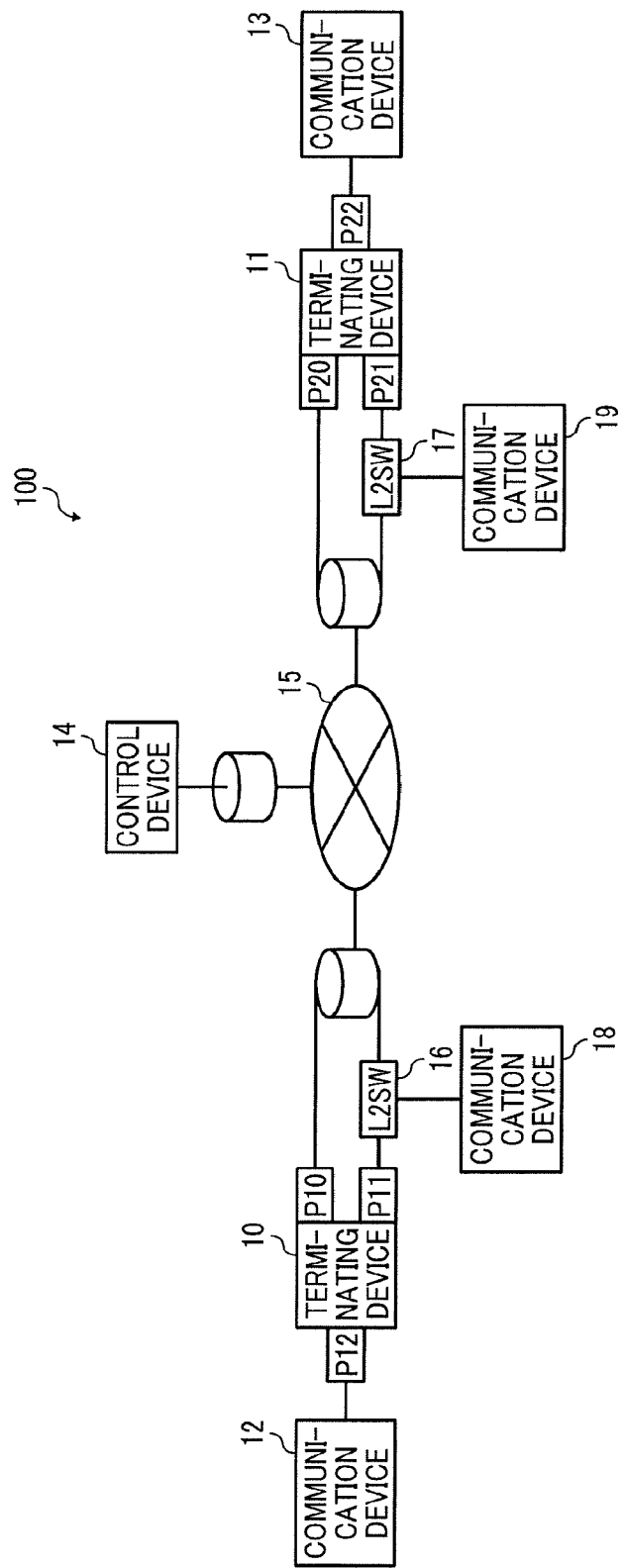
FIG. 1 is a diagram illustrating a configuration example of a communication system according to an embodiment of this disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same function, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings, wherein like reference numerals designate identical or corresponding parts throughout the several views, embodiments of this disclosure will be described.

FIG. 1 is a diagram illustrating a configuration example of a communication system 100 according to an embodiment of this disclosure. The communication system 100 includes at least two terminating devices 10 and 11, communication devices 12 and 13 connected to the terminating devices 10 and 11, respectively, and a control device 14 that controls the terminating devices 10 and 11. The two terminating devices 10 and 11 are provided, respectively, in mutually different segments, of a plurality of segments creating a network. The network includes an Internet protocol (IP) network 15 that exchanges information with the IP, for example. The segments are individual networks each being a local area network (LAN), for example, and are connected by the IP network 15, and layer-2 switches (hereinafter referred to as L2SWs) 16 and 17, which are devices that relay communications between the networks.

The terminating devices 10 and 11 are virtually directly connected to each other to create a network, and are disposed on opposite ends of the network. The terminating devices 10 and 11 may be routers, for example. The terminating device 10 performs a process of transferring input information to the communication device 12 residing in the segment of the terminating device 10 or a communication device 18 connected to the L2SW 16 in the same segment. The terminating device 11 performs a process of transferring input information to the communication device 13 residing in the segment of the terminating device 11 or a communication device 19 connected to the L2SW 17 in the same segment. The terminating devices 10 and 11 exchange control information with the control device 14 to perform the transfer process. The terminating devices 10 and 11 include control plane ports P10 and P20, respectively, as connection ports to be connected to the control device 14 to exchange the control information. A control plane is a communication path for exchanging the control information.

The terminating devices 10 and 11 further communicate with the communication devices 12 and 13, respectively, to exchange information therewith. Thus, the terminating device 10 includes data plane ports P11 and P12 as connection ports to be connected to the communication devices 18 and 12, respectively, to exchange the information. Further, the terminating device 11 includes data plane ports P21 and P22 as connection ports to be connected to the communication devices 19 and 13, respectively, to exchange the information. A data plane is a communication path for transferring the above-described information.

As described above, each of the terminating devices 10 and 11 has a plurality of ports. Each of the ports is implemented as a separate communication module, and thus has a media access control (MAC) address as identification information for identifying an individual communication entity. Each of the ports also has an IP address to be used in communication.

The communication device 12 requests the terminating device 10 in the same segment as that of the communication device 12 to establish a closed direct-connected line (i.e., tunnel) that virtually directly connects devices to each other on the network. With the tunnel thus created, packets to be used between two segments are transmitted and received therebetween without being processed.

When the tunnel is created between the terminating devices 10 and 11, each of the ports P11 and P21 is treated as a tunnel-side data plane port, and each of the ports P12 and P22 is treated as a non-tunnel-side data plane port.

Although the tunnel-side port and the non-tunnel-side port are illustrated as separate physical ports in the present example, the configuration is not limited thereto, and one physical port may be treated as two logical ports.

The control device 14 stores and manages address information such as the IP addresses and the MAC addresses of the terminating devices 10 and 11 and the respective ports of the terminating devices 10 and 11. More specifically, the control device 14 manages, as the address information, a list of correspondences between the IP addresses and the MAC addresses of the control plane ports P10 and P20 of the terminating devices 10 and 11, and the IP addresses and the MAC addresses of the tunnel-side data plane ports P11 and P21 of the terminating devices 10 and 11.

The control device 14 further communicates with the terminating device 10 to request to transmit the information of the communication devices 12 and 18 in the segment of the terminating device 10, and acquires the requested information. Similarly, the control device 14 communicates with the terminating device 11 to request to transmit the information of the communication devices 13 and 19 in the segment of the terminating device 11, and acquires the requested information. The control device 14 then determines which information is to be transferred by the terminating device 10 or 11 to which one of the communication devices 12, 13, 18 and 19, generates a processing rule for performing a process of transferring the information, and transmits the processing rule to the terminating device 10 or 11 as the control information. The control device 14 thereby controls the terminating devices 10 and 11.

In FIG. 1, the terminating device 10 has the port P12 connected to the communication device 12 and the port P11 connected to the communication device 18 via the L2SW 16, and the terminating device 11 has the port P22 connected to the communication device 13 and the port P21 connected to the communication device 19 via the L2SW 17. However, the configuration is not limited thereto. Therefore, each of the terminating devices 10 and 11 may additionally include at least one port on each of the tunnel side and the non-tunnel side, and at least one communication device may further be connected to the additional port.

Hereinafter, the segment with the terminating device 10 will be referred to as the local segment of the terminating device 10, and the communication devices 12 and 18 in the local segment of the terminating device 10 will be referred to as the devices in the local segment of the terminating device 10. The same applies to the terminating device 11; the segment with the terminating device 11 will be referred to as the local segment of the terminating device 11, and the communication devices 13 and 19 in the local segment of the terminating device 11 will be referred to as the devices in the local segment of the terminating device 11.

In a segment, a terminating device and a communication device may be connected by a wired or wireless network. In the present example, communication is performed via the IP network 15, and thus the communication devices 12, 13, 18, and 19 are all compatible with transmission control protocol (TCP)/IP communication. Each of the communication devices 12, 13, 18, and 19 may be any device capable of communicating with the other ones of the communication devices 12, 13, 18, and 19, such as a personal computer (PC), a tablet terminal, a smartphone, a personal digital assistant (PDA), a game machine, a multifunction peripheral (MFP), a projector, or an electronic blackboard, for example.

Figure 2:
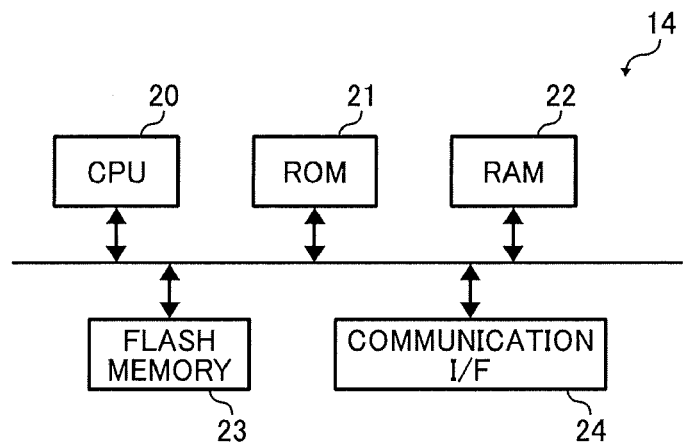
FIG. 2 is a diagram illustrating a hardware configuration of a control device forming the communication system.

FIG. 2 is a diagram illustrating a hardware configuration of the control device 14 in the communication system 100. Each of the terminating devices 10 and 11 and the communication devices 12, 13, 18, and 19 may adopt a hardware configuration similar to that illustrated in FIG. 2. A description will be made here only of the hardware configuration of the control device 14.

The control device 14 includes a central processing unit (CPU) 20, a read-only memory (ROM) 21, a random access memory (RAM) 22, a flash memory 23, and a communication interface (I/F) 24 as hardware. The flash memory 23 is employed in the configuration example described here, but may be replaced by a hard disk drive (HDD) or a solid state drive (SSD), for example.

The ROM 21 is a read-only memory for storing, for example, a program for self-diagnosing hardware such as the CPU 20 and the communication I/F 24 and a boot program for starting up the control device 14. The RAM 22 is a readable and writable memory, and all information stored therein is erased when the control device 14 is powered off.

The RAM 22 provides a work area to the CPU 20. The flash memory 23 stores a program for controlling the terminating devices 10 and 11. The program for this control is for executing a process of acquiring from the terminating devices 10 and 11 the information of the communication devices 12, 13, 18, and 19 in the respective segments, generating a processing rule, and transmitting the processing rule to each of the terminating devices 10 and 11, for example.

The CPU 20 controls the entire control device 14. The CPU 20 deploys the above-described various programs to the RAM 22, and executes the deployed programs to achieve predetermined processes. The communication I/F 24 is connected to the IP network 15 to allow communication with devices on the IP network 15, such as the terminating devices 10 and 11, for example.

Functions of the control device 14 will be described with reference to FIG. 3.

In the control device 14, the CPU 20 deploys the above-described programs to the RAM 22 from the flash memory 23 and other storage units, and executes the deployed programs to achieve the functions of the control device 14. The functions are realized as functional units of the control device 14, which include a storage unit 30, an acquisition unit 31, a generation unit 32, and a transmission unit 33. The functional units of the control device 14 may also include a request reception unit 34, which is optional as indicated by a broken line in FIG. 3. Each of the acquisition unit 31, the generation unit 32, and the request reception unit 34 is achieved by processes executed by the CPU 20. The transmission unit 33 corresponds to the communication I/F 24 controlled by the CPU 20.

Figures 4, 5:
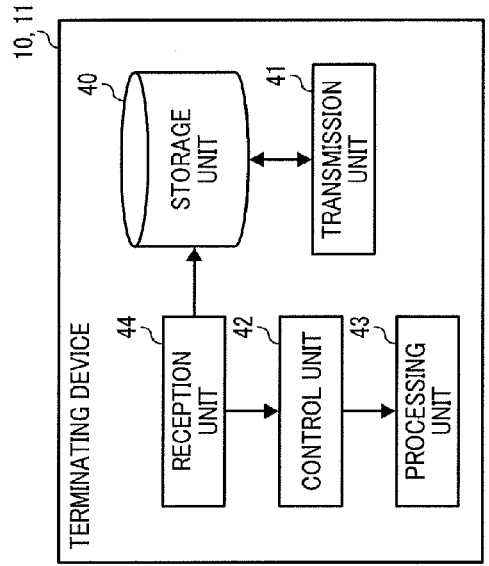
FIG. 4 is a table illustrating an example of address information of terminating devices managed by the control device.
FIG. 5 is a block diagram illustrating a functional configuration of the terminating devices.

The storage unit 30, which is implemented by the flash memory 23, stores the address information of the terminating devices 10 and 11. The address information includes the IP addresses and the MAC addresses of the terminating devices 10 and 11, the control plane ports P10 and P20, and the data plane ports P11, P12, P21, and P22. The control plane ports P10 and P20 are used by the terminating devices 10 and 11, respectively, to communicate with the control device 14. The data plane ports P11, P12, P21, and P22 include tunneling ports. Items of the address information are previously registered in the control device 14 as associated with each other, and are stored in the storage unit 30. The address information stored in the storage unit 30 is managed as the table listing correspondences between items as illustrated in FIG. 4, for example.

Figure 3:
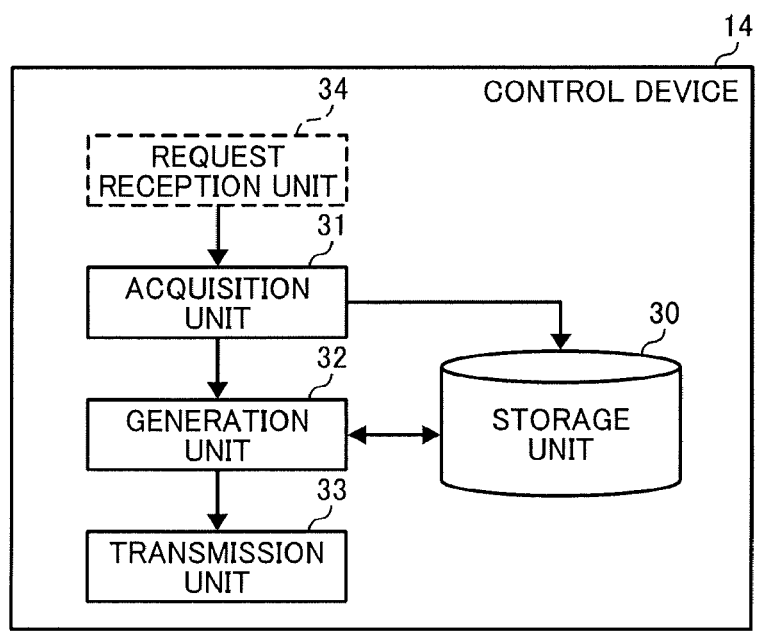
FIG. 3 is a block diagram illustrating a functional configuration of the control device.

As indicated by the broken line in FIG. 3, the control device 14 may include the request reception unit 34 that receives a request from one of the communication devices 12, 13, 18, and 19. If the request reception unit 34 receives a request to establish tunneling between specified terminating devices, the acquisition unit 31 requests, via the control plane, each of the specified terminating devices to transmit the information of the devices in the local segment of the terminating device, and acquires the requested information. It is assumed here that the terminating devices 10 and 11 are the specified terminating devices. The request reception unit 34 is also capable of receiving a request to cancel the tunneling.

The generation unit 32 generates the processing rule for each of the terminating devices 10 and 11 with the address information of the specified terminating devices 10 and 11 stored in the storage unit 30 and the information of the communication devices 12, 13, 18, and 19 acquired by the acquisition unit 31. The transmission unit 33 transmits the processing rule generated by the generation unit 32 to each of the terminating devices 10 and 11 via the control plane.

A processing rule defines a method of processing packets in Layer 1 (L1) to Layer 4 (L4) including encapsulation and decapsulation. A packet includes a header containing information for controlling the transfer destination and the transfer path and a payload forming a data body. Encapsulation is a process of forming a payload portion in a new layer with the header and the payload of the packet and adding another header to the payload portion. Decapsulation, on the contrary, is a process of extracting the payload portion by removing the added another header. The open systems interconnection (OSI) reference model includes layers such as Layer 1 (L1) serving as a physical layer, Layer 2 (L2) serving as a data link layer, Layer 3 (L3) serving as a network layer, and Layer 4 (L4) serving as a transport layer. Details of the processing rule will be described in detail later.

With the above-described configuration, the generation unit 32 generates, for each of the specified terminating devices 10 and 11 and in accordance with the port to which the packet is input and the destination of the packet, the processing rule that determines whether or not to encapsulate the packet, whether or not to decapsulate the packet, and the port for outputting the packet.

FIG. 5 is a block diagram illustrating a functional configuration of each of the terminating devices 10 and 11. Since the terminating devices 10 and 11 have the same configuration, the following description will be limited to the configuration of the terminating device 10. The terminating device 10 includes a storage unit 40, a transmission unit 41, a control unit 42, a processing unit 43, and a reception unit 44 as functional units thereof. Similarly to the functional units of the control device 14, the functional units of the terminating device 10 are also achieved by a CPU deploying programs to a RAM from a flash memory and other storage units and executing the deployed programs.

More specifically, the storage unit 40 is implemented by the flash memory 23. The transmission unit 41 and the reception unit 44 are implemented by the communication I/F 24. The control unit 42 and the processing unit 43 correspond to instructions generated by the CPU 20 based on the programs stored in the RAM 22 and other storage units.

The storage unit 40 stores the information of the devices in the local segment of the terminating device 10. The information of the devices in the local segment of the terminating device 10 includes, for example, the IP address, the MAC address, and the port number of the communication device serving as the transmission source. The information of the devices in the local segment of the terminating device 10 stored in the storage unit 40 is managed with the table as illustrated in FIG. 6, for example.

Returning to FIG. 5, the transmission unit 41 transmits an address resolution protocol (ARP) request packet through the data plane port, and the reception unit 44 receives an ARP reply packet through the data plane port. The ARP is a protocol for obtaining the information of the MAC address from the IP address. The processing unit 43 extracts the information of the MAC address of the transmission source from the ARP reply packet received by the reception unit 44, and stores the extracted information in the storage unit 40 in association with the IP address.

The transmission unit 41 acquires from the storage unit 40 the information of the devices in the local segment of the terminating device 10, and transmits the acquired information to the control device 14. The transmission unit 41 transmits the information to the control device 14 upon receipt of a request from the control device 14 or upon update of the information of the devices in the local segment of the terminating device 10. The control device 14 receives and stores the information in the storage unit 30, and manages the information with the table as illustrated in FIG. 7, for example.

Returning to FIG. 5, the reception unit 44 receives the processing rule from the control device 14, and the control unit 42 issues an instruction to perform a process of transferring the packet based on the processing rule received by the reception unit 44, to thereby control the processing unit 43. In accordance with the instruction and under control of the control unit 42, the processing unit 43 performs the process of transferring the packet with information in L1 to L4 including packet encapsulation and decapsulation.

In the capsulation, the processing unit 43 uses an original packet including a header and a payload as data, and adds a transmission source IP address, a transmission source MAC address, a transmission destination IP address, and a transmission destination MAC address to the original packet as a new header. In the decapsulation, the processing unit 43 extracts the original packet as the data by removing the added header.

The transmission source IP address is the IP address of the tunnel-side data plane port P11 of the terminating device 10, and the transmission source MAC address is the MAC address of the tunnel-side data plane port P11 of the terminating device 10. The data plane is a communication path connecting ports. The transmission destination IP address is the IP address of the tunnel-side data plane port P21 of the destination terminating device 11, and the transmission destination MAC address is the MAC address of the tunnel-side data plane port P21 of the destination terminating device 11.

With reference to the configuration of the communication system 100 illustrated in FIG. 1, a description will be made of the processing rule of the terminating device 10 generated with the address information illustrated in FIG. 4 and the information of the devices in the local segment of the terminating device 10 illustrated in FIGS. 6 and 7. Since the processing rule of the terminating device 11 is similar to that of the terminating device 10 except for the port number, for example, the description will be limited here to the processing rule of the terminating device 10.

The terminating device 10 may receive the packet from the IP network 15 through the port P11 or from the communication device 12 through the port P12. Further, the packet may be a broadcast packet addressed to a plurality of unspecified destinations, a multicast packet addressed to a plurality of specified destinations, or a unicast packet addressed to a single specified destination. The destinations of the packet may include the ports P11 and P12 of the terminating device 10 as well as the communication devices 12, 13, 18, and 19. The processing rule is generated in consideration of these points.

If the broadcast or multicast packet is input to the port P11, a processing rule is generated which stipulates that the encapsulated packet be transmitted from the port P11. This is because it is necessary to transmit the packet to the communication devices 13 and 19 in the segment with the terminating device 11 with which tunneling is established. Further, a processing rule is generated which stipulates that the original packet be transmitted to the port P12. This is because it is necessary to transmit the packet to the communication device 12 in the segment with the terminating device 10. In this case, the packet is transmitted not through the tunnel, and thus is decapsulated into the original packet before being transmitted.

The format of the packet will now be described with reference to FIG. 8.

The original frame transmitted by one of the communication devices 12, 13, 18, and 19 conforms to the frame format of Ethernet (registered trademark) before being encapsulated in the terminating device 10 or 11. That is, the header contains the MAC address of the transmission destination and the MAC address of the transmission source, as illustrated in FIG. 8. For example, when the packet is transmitted from the communication device 12 to the communication device 13, the MAC address of the transmission destination is the MAC address of the communication device 13, and the MAC address of the transmission source is the MAC address of the communication device 12.

In the encapsulation performed in the terminating device 10 or 11, the original frame is used as the foregoing payload (i.e., inner packet), and a new header (i.e., outer tunnel header) is added to the payload. The outer tunnel header is formed of an Ethernet header and an IP header. The Ethernet header contains the MAC addresses of the transmission destination and the transmission source, and the IP header contains the IP addresses of the transmission destination and the transmission source.

The transmission destination MAC address contained in the outer tunnel header is the MAC address of the tunnel-side data plane port of the destination terminating device. The transmission source MAC address contained in the outer tunnel header is the MAC address of the tunnel-side data plane port of the source terminating device. The transmission destination IP address contained in the outer tunnel header is the IP address of the tunnel-side data plane port of the destination terminating device. The transmission source IP address contained in the outer tunnel header is the IP address of the tunnel-side data plane port of the source terminating device.

If the communication device 12 transmits the multicast packet, an Ethernet frame transmitted to the terminating device 10 by the communication device 12 contains a multicast address and the MAC address of the communication device 12, as illustrated in FIG. 9. The multicast address is the address of a group of specified communication devices. The group may be, but not limited to, one segment, for example.

The original frame illustrated in FIG. 9 is encapsulated into the packet illustrated in FIG. 10. That is, the original frame is used as the inner packet, and the outer tunnel header is added to the inner packet. The outer tunnel header contains the Ethernet header, which contains the MAC address of the port P21 of the destination terminating device 11 and the MAC address of the port P11 of the source terminating device 10. The outer tunnel header further contains the IP header, which contains the IP address of the port P21 of the destination terminating device 11 and the IP address of the port P11 of the source terminating device 10.

The above-configured packet reaches the port P21 of the terminating device 11 via the IP network 15, and is decapsulated in the terminating device 11 and delivered to the communication devices 13 and 19 in the segment to which the terminating device 11 belongs.

Returning to FIG. 8, a description will be made of a case in which the unicast packet is input to the port P11.

If the destination of the unicast packet is the address of the port P11 of the terminating device 10, the packet is decapsulated in the terminating device 10. In the decapsulation, the added outer tunnel header is removed from the encapsulated packet illustrated in FIG. 10. The decapsulated packet is then referred to, and if the destination of the decapsulated packet is broadcast or multicast, a processing rule is generated which stipulates that the decapsulated packet be transmitted to the ports P11 and P12. This is because the port P11 is connected, via the L2SW 16, to the communication device 18 as a device in the local segment of the terminating device 10, and the port P12 is connected to the communication device 12 as a device in the local segment of the terminating device 10.

In the configuration example illustrated in FIG. 1, the port P11 is connected to the L2SW 16, and the communication device 18 is connected to the L2SW 16 between the terminating devices 10 and 11. Thus, the processing rule is generated to transmit the packet also to the port P11. If there is only the communication device 12 connected the port P12, however, a processing rule is generated which stipulates that the decapsulated packet be transmitted only to the port P12.

If the destination of the decapsulated packet referred to is unicast, a processing rule is generated which stipulates that the packet be transmitted to the port connected to the destination communication device. For example, the processing rule stipulates that the packet be transmitted to the port P12 if the packet destination is the communication device 12, and to the port P11 if the packet destination is the communication device 18.

If the destination of the unicast packet is not the address of the port P11 of the terminating device 10 but the communication device 12, a processing rule is generated which stipulates that the packet be decapsulated in the terminating device 10 and transmitted from the port P12. This is because the communication device 12 is a device in the local segment of the terminating device 10, and thus it is necessary to transmit the original packet to the communication device 12, which is connected to the port P12.

If the destination of the unicast packet is the communication device 18, a processing rule is generated which stipulates that the packet be decapsulated in the terminating device 10 and transmitted from the port P11. This is because the communication device 18 is a device in the local segment of the terminating device 10, and thus it is necessary to transmit the original packet to the communication device 18, which is connected to the port P11 via the L2SW 16.

If the destination of the unicast packet is the communication device 13 or 19 in the other segment, a processing rule is generated which stipulates that the packet be transmitted from the port P11 in the encapsulated form, without being decapsulated. This is because the tunnel is established with the terminating device 11 in the other segment, and is connected to the port P11.

The foregoing description has been made of the processing rule in the case in which the packet is input to the port P11 of the terminating device 10.

A description will now be made of the processing rule in a case in which the packet is input to the port P12 of the terminating device 10. Also in this case, the packet may be the broadcast packet, the multicast packet, or the unicast packet.

If the broadcast or multicast packet is input to the port P12, a processing rule is generated which stipulates that the packet be encapsulated in the terminating device 10 and transmitted from the port P11. This is because the tunnel is established between the port P11 and the other segment, i.e., the packet is transmitted through the tunnel, and thus it is necessary to transmit the packet from the port P11. Further, a processing rule is generated which stipulates that the original packet be transmitted from the port P11. This is because the local segment of the terminating device 10 includes the communication device 18, which is connected to the port P11 via the L2SW 16.

A description will be made of a case in which the unicast packet is input to the port P12.

The destination of the unicast packet may be the communication device 18 in the local segment of the terminating device 10 or the communication device 13 or 19 in the other segment. If the destination of the unicast packet is the communication device 18 in the local segment of the terminating device 10, a processing rule is generated which stipulates that the original packet be transmitted from the port P11 connected to the communication device 18. If the communication device 18 is connected to the port P12, a processing rule is generated which stipulates that the original packet be transmitted from the port P12.

If the destination of the unicast packet is the communication device 13 or 19 in the other segment, the packet is transmitted through the tunnel. Thus, a processing rule is generated which stipulates that the packet be encapsulated in the terminating device 10 and transmitted from the port P11. This is because the tunnel is established with the other segment, and is connected to the port P11.

In the capsulation of the packet, the MAC address and the IP address of the port P21 are used as transmission destination addresses, and the MAC address and the IP address of the port P11 are used as transmission source addresses.

Figure 11:
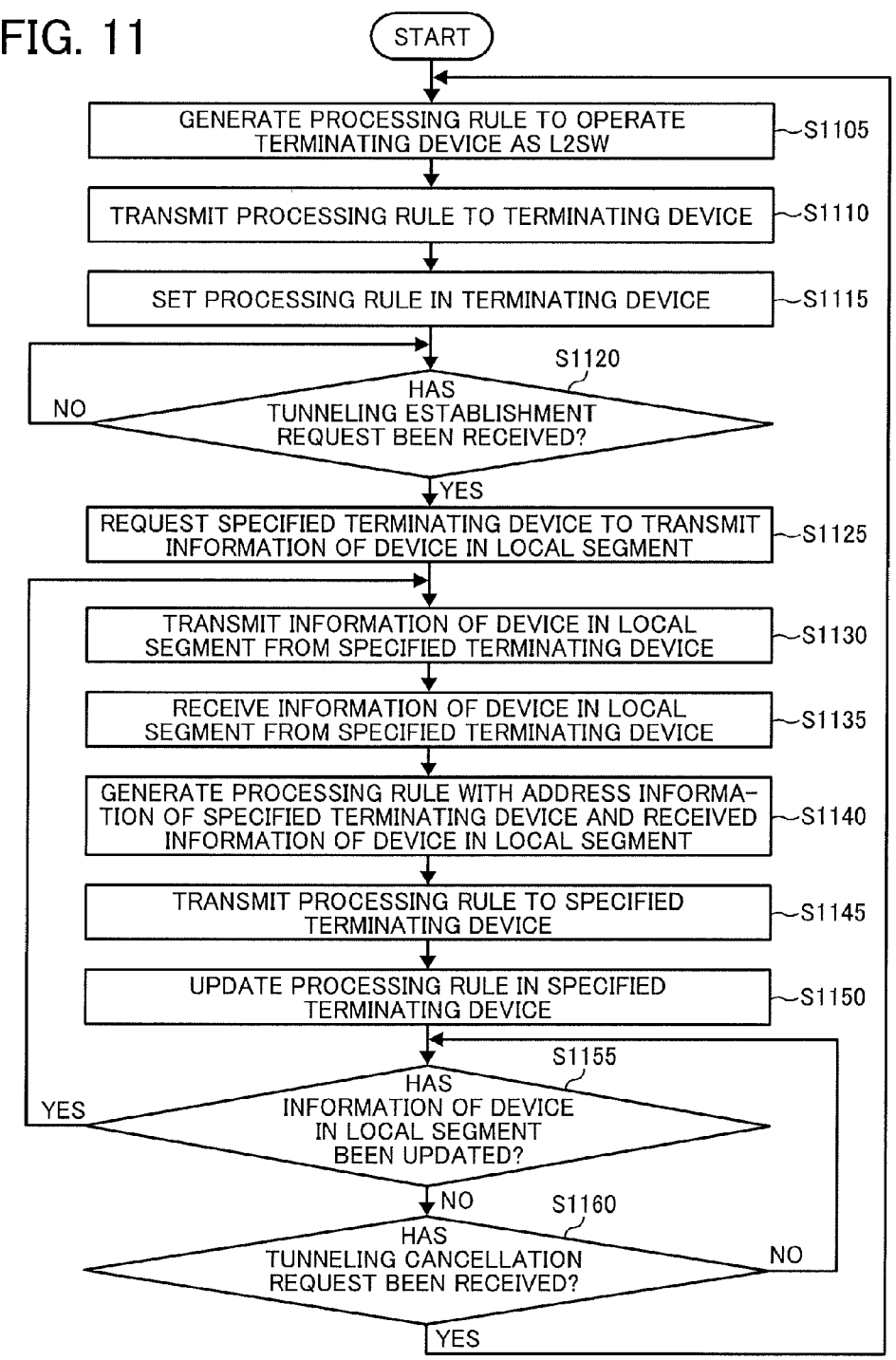
FIG. 11 is a flowchart illustrating a procedure of processing executed by the communication system.

With reference to the flowchart illustrated in FIG. 11, a process of generating the processing rule will be described in detail.

It is assumed that the address information of the terminating devices 10 and 11 is previously registered and held in the control device 14. At step S1105, the control device 14 generates a processing rule which stipulates that, before the tunnel is established, each of the terminating devices 10 and 11 operate as an L2SW, i.e., a switch that performs a switching operation in accordance with the destination of the packet. For example, if the destination of the packet is the communication device 18, the control device 14 generates a processing rule for connecting the L2SW to the communication device 18. At step S1110, the control device 14 transmits, via the control plane, the generated processing rule to the terminating device that is to be caused to execute the processing. In the above-described example, the control device 14 transmits the processing rule to the terminating device 10 to cause the terminating device 10 to execute the processing.

At step S1115, the terminating device receives the processing rule via the control plane, sets the processing rule therein, and starts operating simply as the L2SW. Then, at step S1120, it is determined whether or not a request to establish tunneling has been received, i.e., whether or not the control device 14 has received a tunneling establishment request from one of the communication devices 12, 13, 18, and 19. The determination is repeated until the receipt of the tunneling establishment request.

If the tunneling establishment request is received at step S1120 (YES at step S1120), the control device 14 at step S1125 requests, via the control plane, the terminating devices 10 and 11 specified for tunneling to transmit the information of the devices in the local segments of the terminating devices 10 and 11. Specifically, the two terminating devices 10 and 11 are specified for establishing a tunnel therebetween, and the control device 14 requests each of the two specified terminating devices 10 and 11 to transmit the information of the devices in the local segment thereof.

At step S1130, each of the terminating devices 10 and 11 receives the request to transmit the information of the devices in the local segment thereof, and transmits the information held thereby to the control device 14 via the control plane. At step S1135, the control device 14 receives from each of the specified terminating devices 10 and 11 the information of the devices in the local segment thereof.

At step S1140, the control device 14 generates a processing rule for processing the packet in each of the specified terminating devices 10 and 11 with the previously registered address information of the terminating devices 10 and 11 and the received information of the devices in the local segments of the terminating devices 10 and 11. The processing rule is generated as described above. At step S1145, the control device 14 transmits the generated corresponding processing rule to each of the specified terminating devices 10 and 11 via the control plane. The control device 14 thus generates the corresponding processing rule for each the specified terminating devices 10 and 11, and transmits the generated processing rule to each of the corresponding terminating devices 10 and 11.

At step S1150, each of the terminating devices 10 and 11 updates the already set processing rule with the newly received processing rule. While the old processing rule causes each of the terminating devices 10 and 11 to operate as the L2SW, the update allows the terminating devices 10 and 11 to perform a packet transfer process with information in L1 to L4 including encapsulation and decapsulation.

During the packet transfer process by the terminating device 10 or 11, if a change occurs in the connection of any of the devices in the local segment of the terminating device 10 or 11, a change is detected in the packet transmitted from the device in the local segment thereof. Upon detection of the change, the terminating device 10 or 11 updates the information of the device in the local segment thereof. At step S1155, whether or not the information of the devices in the local segment of the terminating device 10 or 11 has been updated is determined. If the information has been updated (YES at step S1155), the procedure returns to step S1130 to transmit the information to the control device 14. If the information has not been updated (NO at step S1155), the procedure proceeds to step S1160.

At step S1160, whether or not the control device 14 has received a request to cancel the tunneling is determined. If the control device 14 has not received the tunneling cancellation request (NO at step S1160), the procedure returns to step S1155. If the control device 14 has received the tunneling cancellation request (YES at step S1160), the procedure returns to step S1105. After having received the tunneling cancellation request, the control device 14 generates again the processing rule stipulating that the specified terminating devices 10 and 11 operate as the L2SWs, and transmits the generated processing rule to the specified terminating devices 10 and 11 via the control plane. Then, the specified terminating devices 10 and 11 receive the processing rule, and update the current processing rule with the received processing rule. Thereby, the terminating devices 10 and 11 operate as the L2SWs, and the process continues until the terminating devices 10 and 11 are powered off.

Figure 12:
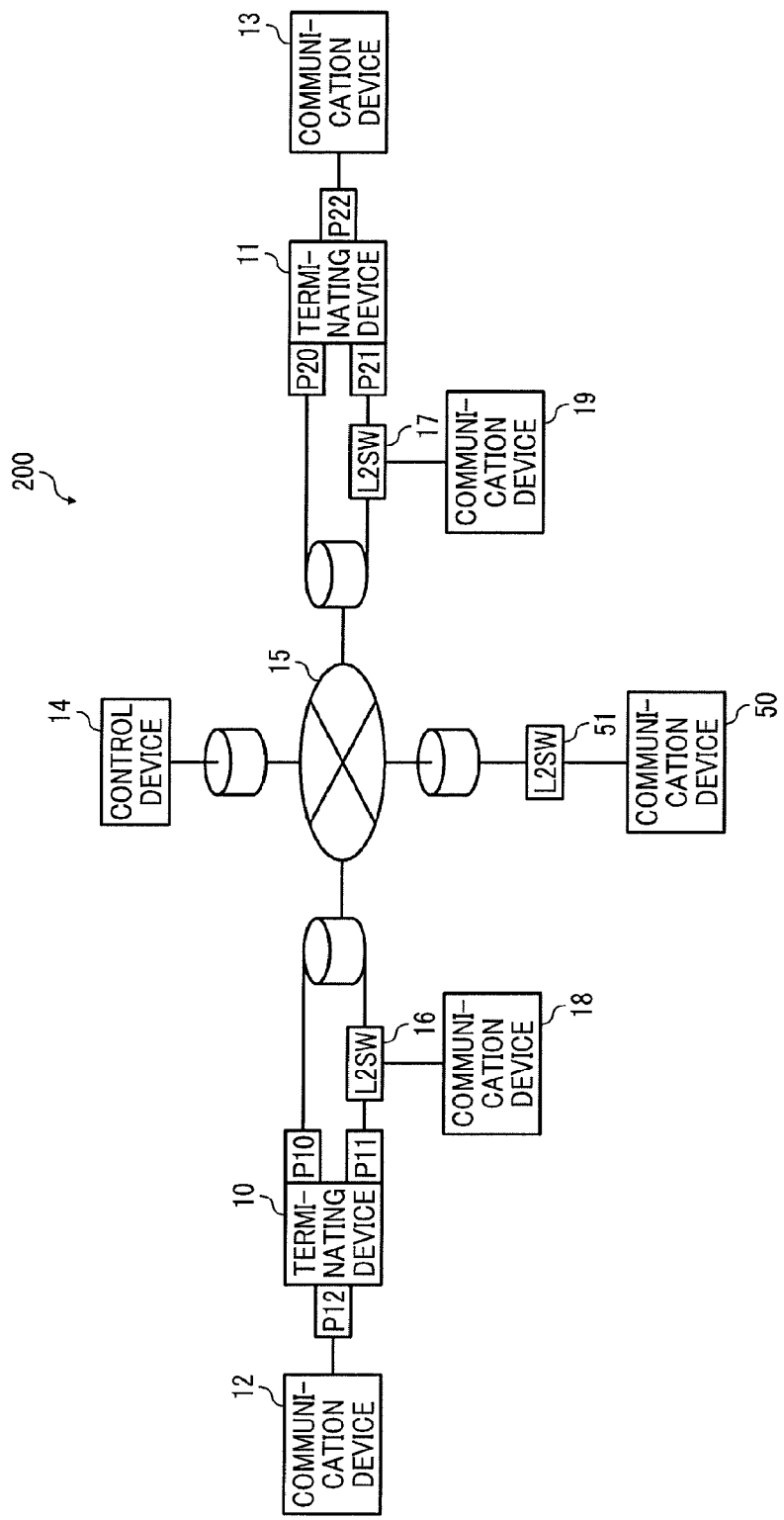
FIG. 12 is a diagram illustrating another configuration example of the communication system.

Although FIG. 1 illustrates the configuration example of the communication system 100 having two segments, the number of segments is not limited to two. For example, the communication system 100 may be modified to have a segment other than the segments to which the terminating devices 10 and 11 belong, as illustrated in FIG. 12. FIG. 12 illustrates the configuration of a communication system 200 having a communication device 50 as a segment other than the segments to which the terminating devise 10 and 11 belong. This segment is connected to the IP network 15 by an L2SW 51.

In this type of configuration, the processing rule applied in the tunneling is the same as that described above in the case of the broadcast or multicast packet. Also in the case of the unicast packet addressed to one of the ports of the terminating devices 10 and 11 or the communication device 12, 13, 18, or 19, the processing rules is the same as that described above. This is because the broadcast or multi cast packet is transmitted to the segments to which the terminating devices 10 and 11 belong, and the unicast packet is transmitted to the ports of the terminating devices 10 and 11, the communication devices 12 and 18 connected to the terminating device 10, and the communication devices 13 and 19 connected to the terminating device 11.

In the case of the unicast packet addressed to the communication device 50, the packet transmission is performed based on a processing rule. If the packet is input to the port P11 of the terminating device 10, a processing rule is generated which stipulates that the original packet be transmitted from the tunnel-side port. Specifically, the processing rule stipulates that the packet be decapsulated in the terminating device 10, and that the original packet obtained through the decapsulation be transmitted from the port P11 of the terminating device 10.

Further, if the packet is input to the port P12 of the terminating device 10, a processing rule is generated which stipulates that the original packet be transmitted from the tunnel-side port. Specifically, the processing rule stipulates that the original packet input to the port P12 be transmitted intact from the port P11 of the terminating device 10.

In a typical existing communication system, communication takes place only between the communication devices 12 and 13 located downstream of the terminating devices 10 and 11, respectively, during the tunneling established between the terminating devices 10 and 11. That is, during the tunneling, communication is cut off from a terminal located outside a network of devices virtually directly connected to each other by the tunneling. The processing rule generated and updated as described above, however, allows communication with the communication devices 18 and 19 other than the communication devices 12 and 13 during the tunneling, thereby increasing the number of devices with which communication is possible, and thus expanding the range of communication.

Although the foregoing description has been made of two terminating devices, between which the tunneling is established, this disclosure is similarly applicable to a case in which a plurality of tunnels are established at the same time, such as a case in which two tunnels are established between two pairs of four terminating devices.

This disclosure also provides a program for causing a computer to execute the processes performed by the control device 14 and the terminating devices 10 and 11 and a recording medium, such as a compact disc (CD)-ROM, a digital versatile disk (DVD), or a secure digital (SD) card, storing the program. For example, a server connected to a network may hold the program and provide the program in response to a request to download the program.

Numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. Further, the above-described steps are not limited to the order disclosed herein. It is therefore to be understood that, within the scope of the appended claims, this disclosure may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

This disclosure can be implemented in any convenient form, for example using dedicated hardware, or a mixture of dedicated hardware and software. This disclosure may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since this disclosure can be implemented as software, each and every aspect of this disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A control device to control two terminating devices virtually directly connected to each other on a network, the control device comprising:
a memory configured to store address information of each of the terminating devices, the terminating devices respectively belonging to different segments on the network, wherein each of the terminating devices includes a plurality of ports;
circuitry configured to:
acquire, from each of the terminating devices, information of a communication device residing in the segment to which each of the terminating devices belongs;

generate, with the address information of each of the terminating devices stored in the memory and the acquired information of the communication device residing in the segment, a processing rule to be used by each of the terminating devices to perform a process of transferring input information; and a transmitter configured to transmit the processing rule to each of the terminating devices, wherein the address information includes an Internet protocol address and a media access control address of one of the plurality of ports that is used to communicate with the control device, and an Internet protocol address and a media access control address of one of the plurality of ports that is used to virtually directly connect the two terminating devices to each other, wherein the information of the communication device includes an Internet protocol address and a media access control address of the communication device and identification information for identifying one of the plurality of ports that is used to communicate with the communication device, wherein communication between the two terminating devices virtually directly connected to each other is performed through transmission and reception of encapsulated information added with respective Internet protocol addresses and media access control addresses of the two terminating devices, and wherein the circuitry is further configured to generate, for each of the terminating devices and in accordance with one of the plurality of ports that receives the input information and a destination of the input information, a processing rule specifying whether to encapsulate the input information, whether to decapsulate the encapsulated information by removing the Internet protocol addresses and the media access control addresses of the two terminating devices from the encapsulated information, and one of the plurality of ports to output the input information.

2. The control device of claim 1, wherein if the destination of the input information is a communication device connected between the two terminating devices and residing in the segment to which one of the two terminating devices belongs, the circuitry is configured to generate a processing rule to cause the one of the two terminating devices to decapsulate the encapsulated information and output the decapsulated information from the one of the plurality of ports that is used to virtually directly connect the two terminating devices to each other.

3. The control device of claim 1, wherein if the destination of the input information is a communication device residing in a segment on the network and not including either of the two terminating devices, the circuitry is configured to generate a processing rule to decapsulate the encapsulated information and output the decapsulated information from the one of the plurality of ports that is used to virtually directly connect the two terminating devices to each other.

4. The control device of claim 1, further comprising a request receiver configured to receive a request to virtually directly connect the two terminating devices to each other and a request to cancel virtual direct connection between the two terminating devices, wherein before the request receiver receives the request to virtually directly connect the two terminating devices to each other, and after the request receiver receives the request to cancel the virtual direct connection between two terminating devices, the circuitry is configured to generate a processing rule to cause each of the terminating devices to operate as a switch that performs a switching operation in accordance with a destination of the input information.

5. A communication system comprising the control device of claim 1 and two terminating devices virtually directly connected to each other on a network.

6. The communication system of claim 5, wherein each of the terminating devices includes:

a memory to store information of a communication device residing in one of a plurality of segments on the network and including each of the terminating devices, a transmitter configured to transmit information of the communication device to the control device in response to a request from the control device, a receiver configured to receive from the control device a processing rule to be used by each of the terminating devices to perform a process of transferring input information, a controller configured to issue an instruction to perform the process of transferring the input information based on the processing rule, and a processor configured to perform the process of transferring the input information in accordance with the instruction from the control device.

7. A control method of controlling two terminating devices virtually directly connected to each other on a network, the control method comprising:

storing, in a memory, address information of each of the terminating devices, the terminating devices respectively belonging to mutually different segments on the network, wherein each of the terminating devices includes a plurality of ports;

acquiring, from each of the terminating devices, information of a communication device residing in the segment to which each of the terminating devices belongs;

generating, with the address information of each of the terminating devices stored in the memory and the acquired information of the communication device residing in the segment, a processing rule to be used by each of the terminating devices to perform a process of transferring input information; and transmitting the generated processing rule to each of the terminating devices, wherein the address information includes an Internet protocol address and a media access control address of one of the plurality of ports that is used to communicate with the control device, and an Internet protocol address and a media access control address of one of the plurality of ports that is used to virtually directly connect the two terminating devices to each other, wherein the information of the communication device includes an Internet protocol address and a media access control address of the communication device and identification information for identifying one of the plurality of ports that is used to communicate with the communication device, wherein communication between the two terminating devices virtually directly connected to each other is performed through transmission and reception of encapsulated information added with respective Internet protocol addresses and media access control addresses of the two terminating devices, and generating, for each of the terminating devices and in accordance with one of the plurality of ports that receives the input information and a destination of the input information, a processing rule specifying whether to encapsulate the input information, whether to decapsulate the encapsulated information by removing the Internet protocol addresses and the media access control addresses of the two terminating devices from the encapsulated information, and one of the plurality of ports to output the input information.

8. A non-transitory computer-readable recording medium storing instructions for causing a computer to execute a control method of controlling two terminating devices virtually directly connected to each other on a network, the control method comprising:

storing, in a memory, address information of each of the terminating devices, the terminating devices respectively belonging to mutually different segments on the network, wherein each of the terminating devices includes a plurality of ports;

acquiring, from each of the terminating devices, information of a communication device residing in the segment to which each of the terminating devices belongs;

generating, with the address information of each of the terminating devices stored in the memory and the acquired information of the communication device residing in the segment, a processing rule to be used by each of the terminating devices to perform a process of transferring input information; and transmitting the generated processing rule to each of the terminating devices, wherein the address information includes an Internet protocol address and a media access control address of one of the plurality of ports that is used to communicate with the control device, and an Internet protocol address and a media access control address of one of the plurality of ports that is used to virtually directly connect the two terminating devices to each other, wherein the information of the communication device includes an Internet protocol address and a media access control address of the communication device and identification information for identifying one of the plurality of ports that is used to communicate with the communication device, wherein communication between the two terminating devices virtually directly connected to each other is performed through transmission and reception of encapsulated information added with respective Internet protocol addresses and media access control addresses of the two terminating devices, and generating, for each of the terminating devices and in accordance with one of the plurality of ports that receives the input information and a destination of the input information, a processing rule specifying whether to encapsulate the input information, whether to decapsulate the encapsulated information by removing the Internet protocol addresses and the media access control addresses of the two terminating devices from the encapsulated information, and one of the plurality of ports to output the input information.

* * * * *